Oct. 2, 1945.        W. H. MOORE         2,385,875
TRAP
Filed Feb. 11, 1944
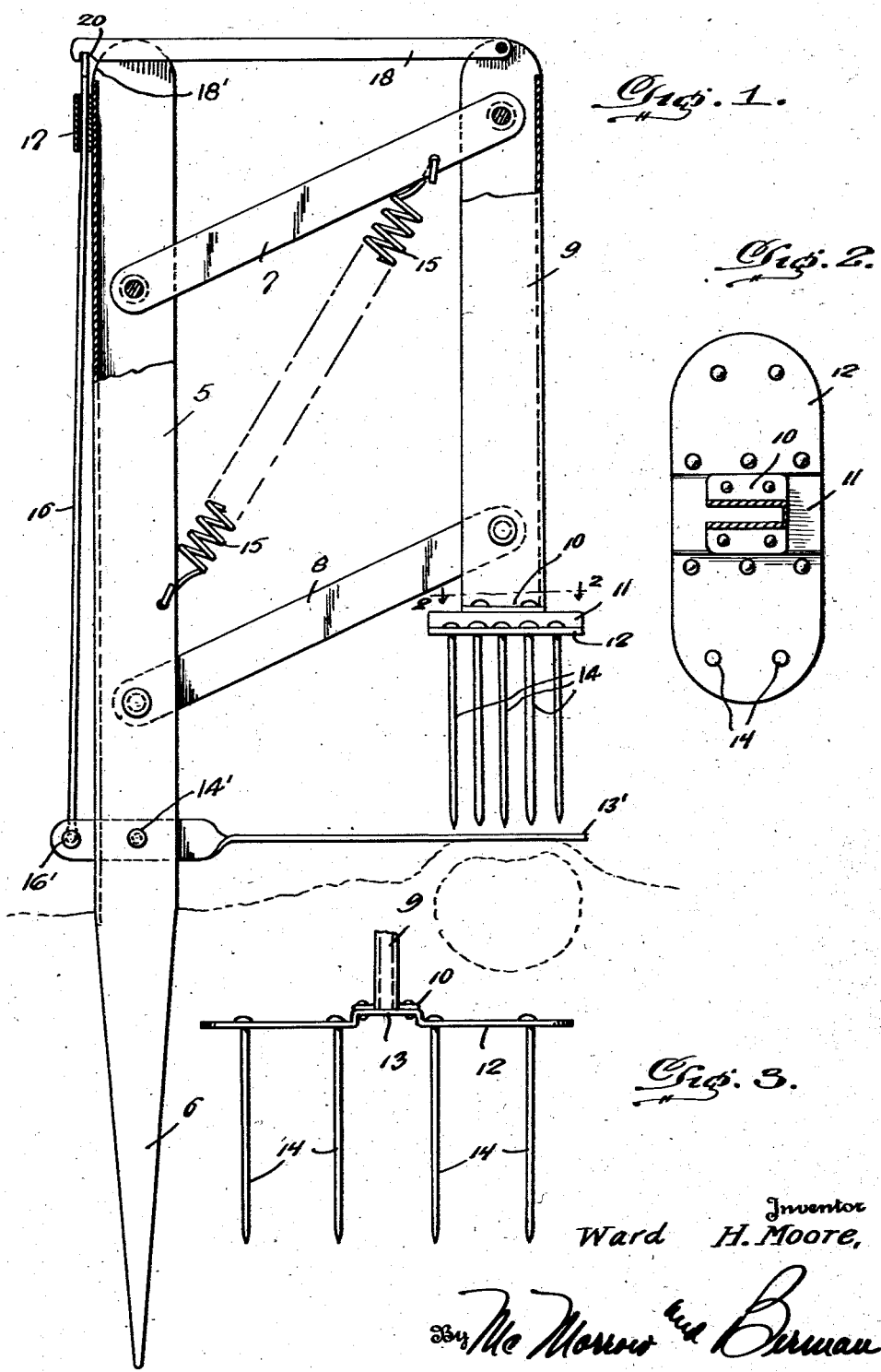
Inventor
Ward H. Moore, Patented Oct. 2, 1945

2,385,875

UNITED STATES PATENT OFFICE 2,385,875
TRAP

Ward H. Moore, Ames, Iowa

Application February 11, 1944, Serial No. 522,002

2 Claims. (Cl. 43—80)

This invention relates to a trap especially adapted for catching moles and other similar animals which burrow and move from place to place under and close to the surface of the ground.

The primary object of the invention is the provision of an efficient and inexpensive device of the above stated character which may be easily and quickly set up for use wherever there is indication of the presence of a burrowing type animal and which will be extremely sensitive to the movement of the ground surface to bring about the tripping and operation of the device to catch the animal by an impaling action which not only catches the animal but will kill the animal quickly to obviate torture or undue suffering by the animal when caught.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation, partly in section, illustrating a trap constructed in accordance with my invention.

Figure 2 is a sectional view taken on the line 2—2 of Figure 1.

Figure 3 is a fragmentary side elevation illustrating a penetrating element of the trap.

Referring in detail to the drawing, the numeral 5 indicates a post, one end portion of which is pointed, as shown at 6, to facilitate the insertion of the post in the ground so that the post may be arranged vertically. The post is preferably constructed of channel iron material and has pivoted thereto upper and lower links 7 and 8. The free ends of the links 7 and 8 have pivoted thereto a member 9 of channel iron construction which is adapted to move in a substantially vertical path during the pivotal movements of the links on the post. The lower end of the member 9 is bent to form attaching ears 10 secured to an offset 11 formed in an elongated head 12. The offset 11 in the head 12 provides in the under face thereof a recess 13 capable of receiving therein a treadle 13'. Secured to the head 12 is a plurality of spaced tines 14. A coil spring 15 is connected to the link 7 adjacent its free end and to the post, the purpose of which is to drive the member 9 downwardly to bring about the movement of the tines past the treadle and deep into the ground.

The treadle 13' is of elongated formation and adjacent one end thereof is pivoted on the post as shown at 14' and has connected therto a latch rod 16 slidably mounted in a sleeve 17 carried by the post adjacent the upper end of the latter. The latch rod 16 is pivoted to the treadle 13', as at 16'. A latch arm 18 has one end pivoted to the upper end of the member 9 and is adapted to be brought into a bifurcation 18' at the upper end of the post with the notch 20 thereof engaged with the latch rod 16. When the latch rod is in engagement with the notch of the arm 18 the member 9 is retained in a raised position with the lower ends of the tines above the treadle so that when the post is inserted into the ground a sufficient depth for the firm support of the post, the treadle will be arranged close to the surface of the ground so that should an animal burrow in the ground under the treadle it will cause a pivotal movement thereto and bring about freeing of the arm 18. The spring 15 immediately acts to drive the member 9 downwardly when the arm 18 is disengaged from the latch rod 16. The downward movement of the member 9 drives the tines past the treadle in to the ground and into the animal. The large number of tines employed, assures one or more of the tines striking a vital part or organ of the animal to bring about substantially instantaneous death thereto. The offset 11 providing the recess 13 in the head assures of the tines being driven fully into the ground without being interfered with by the head being stopped in its downward movement by the treadle. The treadle moving into the recess 13 assures the major portion of the head coming to rest on the surface of the ground.

A trap of the kind specified will be extremely economical to construct, durable, easy to set and be extremely sensitive for the tripping thereof by the movement of the surface of the ground.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a trap, a post to be inserted in the ground and having a bifurcated upper end, links pivoted to said post, a member pivoted to said links, a spring connected to one of the links and to the post to drive said member in a downward direction toward the ground, a head secured to the lower end of the member and having a recess, a plurality of tines carried by the head and grouped at opposite sides of the recess, an elongated treadle pivoted on the post and adapted to engage the ground and to be actuated by an animal moving under the surface of the ground, said recess receiving the treadle when the head contacts the ground, and a latch mechanism between the member and the treadle with a portion thereof arranged in the bifurcation of the post.

2. In a trap, a post to be inserted in the ground and having a bifurcated upper end, links pivoted to said post, a member pivoted to said links, a spring connected to one of the links and to the post to drive said member in a downward direction toward the ground, a head secured to the lower end of the member and having a recess, a plurality of tines carried by the head and grouped at opposite sides of the recess, an elongated treadle pivoted on the post and adapted to engage the ground and to be actuated by an animal moving under the surface of the ground, said recess receiving the treadle when the head contacts the ground, a latch rod slidably mounted on the post and pivotally connected to the treadle, a latch arm pivotally connected to the upper end of the member and adapted to enter the bifurcation of the post and having a notch to receive the latch rod to cooperate therewith in maintaining the member in an elevated position against the action of the spring until the treadle is disturbed by the movement of the surface of the ground by the animal.

WARD H. MOORE.